(12) United States Patent
Kwak et al.

(10) Patent No.: US 7,782,248 B2
(45) Date of Patent: Aug. 24, 2010

(54) UWB DISTANCE MEASUREMENT SYSTEM AND METHOD OF DRIVING THE SAME

(75) Inventors: Kyung Sup Kwak, Incheon (KR); Tae-Kyung Sung, Incheon (KR); Hanbing Shen, Incheon (KR)

(73) Assignee: Inha-Industry Partnership Institute, Incheon (KR)

( * ) Notice: Subject to any disclaimer, the term of this patent is extended or adjusted under 35 U.S.C. 154(b) by 104 days.

(21) Appl. No.: 12/344,506

(22) Filed: Dec. 27, 2008

(65) Prior Publication Data

US 2009/0262010 A1    Oct. 22, 2009

(30) Foreign Application Priority Data

Apr. 22, 2008    (KR) ...................... 10-2008-0037210

(51) Int. Cl.
G01S 13/08 (2006.01)
(52) U.S. Cl. .................. 342/145; 342/118; 342/128; 342/132; 342/109; 342/189
(58) Field of Classification Search ................. 342/118, 342/128, 132, 145, 109, 189
See application file for complete search history.

(56) References Cited

U.S. PATENT DOCUMENTS 6,714,775 B1 * 3/2004 Miller .......................... 455/296

OTHER PUBLICATIONS

Chu et. al., "The Effect of NBI on UWB Time-Hopping System," Wireless Communication, IEEE Transactions on Wireless Communications, vol. 3, No. 5, Sep. 2004 pp. 1431-1436.

Stephanedes, Yorgos J., "Communicatons for the Intelligent Transportation System," IEEE Communications Magazine, Oct. 1996, pp. 24-30.

Win et. al., "Ultra-Wide Bandwidth Time-Hopping Spread-Spectrum Impulse Radio for Wireless Multiiple-Access Communications," IEEE Transactions on Communications, vol. 48, No. 4, Apr. 2000, pp. 679-691.

Mccue, J.J. G., "A Note on the Hamming Weighting of Linear-FM Pulses," Proceedings of the IEEE Publication, vol. 67:11, Nov. 1979, pp. 1575-1577.

* cited by examiner

Primary Examiner—Thomas H Tarcza
Assistant Examiner—Timothy A Brainard
(74) Attorney, Agent, or Firm—Edwards Angell Palmer & Dodge LLP; Peter C. Lauro, Esq.

(57) ABSTRACT

The present invention relates to a UWB distance measurement system and method of driving the system. The system includes a reception antenna for receiving a signal, which is output from a transmission unit, is reflected from a target and is incident on the reception antenna, a UWB amplifier for amplifying the received signal and generating a first signal, a reference waveform generator for generating a reference waveform which is a reference for analysis of the first signal, a window function generator for generating at least one window function that is applied to the first signal, a correlator for correlating the first signal with the window function output from the window function generator, and generating a second signal which is a revised frequency response of the first signal, and a delay time detector for detecting a delay time component in the second signal.

12 Claims, 10 Drawing Sheets

DISTANCE MEASUREMENT ERROR RATE VERSUS $E_b/N_0$, SIR=−30dB

FIG. 6

DISTANCE MEASUREMENT ERROR RATE VERSUS SIR, $E_b/N_0$=15dB

UWB DISTANCE MEASUREMENT SYSTEM AND METHOD OF DRIVING THE SAME

CROSS-REFERENCE TO RELATED APPLICATION

This application claims under 35 U.S.C. §119(a) the benefit of Korean Patent Application No. 10-2008-0037210 filed Apr. 22, 2008, the entire contents of which are incorporated herein by reference.

BACKGROUND

1. Technical Field

The present invention relates, in general, to an Ultra-WideBand (UWB) distance measurement system and a method of driving the system, and, more particularly, to a distance measurement system using UWB communication and a method of driving the system, which can improve the efficiency of vehicle traveling and intelligent transportation systems.

2. Related Art

Recently, as communication technology is applied to various fields, new types of services have been actively provided. Among these services, Intelligent Transportation Systems (ITS) in which wireless communication technology, such as Ultra-WideBand (UWB) technology, and distance measurement technology are combined with each other for improving the efficiency of vehicle traveling and transportation systems have recently been provided, and the development of technology related to ITS has been actively conducted.

In current wireless communication fields, a demand for frequency has rapidly increased compared to limited frequency resources. As one method of solving this problem, a UWB communication method capable of more efficiently utilizing frequency resources by sharing the frequency spectrum of existing communication systems has attracted attention.

Such a UWB communication method is a wireless transmission technology for transmitting digital data at ultra-wideband frequencies using very low power, and enabling reliable communication by constructing ultra high-speed and high-performance wireless networks using very low power. Further, a UWB communication method has been widely used in equipments having low intercept and detection probability, collision prevention equipments for vehicles and aircraft, altimeters for measuring altitude above the earth's surface in airplanes and other airline facilities, and important national defense technologies and public fields specially requiring secure communication, such as location tracking.

In the case of UWB signals, which are transmitted in the form of wideband pulses, as signals having a short pulse width are sequentially transmitted, mutual interference between the signals is decreased, thus enabling the transmission performance of signals to be maintained in a multi-path environment. Since a UWB communication method facilitates the precise resolution of multiple paths thanks to the use of ultrashort pulses, it can also be applied to location tracking fields having reception diversity and accuracy of several cm.

Standards for such a UWB communication method were established by the U.S. Federal Communications Commission (FCC) in 2002. The standards limit the transmission power and spectrum of UWB indoor and outdoor communication systems.

The U.S. FCC permits the occupation of a frequency band ranging from 3.10 GHz to 10.60 GHz having a power spectrum density of −41.3 or less [dBm/MHz] for the UWB communication method. Since a UWB communication method uses a wide frequency bandwidth, as described above, it can be applied to various application fields. Thanks to this advantage, a UWB communication method has been applied especially to distance measurement fields enabling the relative distance between radar terminals to be accurately measured among various application fields.

In a UWB communication method, since required power per unit bandwidth is very low due to ultra-wideband characteristics, and, as a result, power consumption is low and large channel capacity is provided, the UWB communication method can support a large amount of data processed and a high transfer rate, compared to existing communication systems.

However, the advantage of a transmission stage in the UWB communication method may result in a problem in that a reception stage must process a procedure for detecting that signals having the form of ultrashort pulses are received at the very low level of intensity and synchronizing the signals at regular intervals of several nanoseconds. Further, a pulse-type UWB communication method that uses the extremely short duration of time pulses, having an extremely high peak value compared to an average rate, is disadvantageous in that, when a communication system is designed to be operated in a high frequency bandwidth at a low data rate, hardware problems such as the nonlinearity of power amplification are caused.

Therefore, the improvement of reliability of a useful and efficient UWB communication method greatly influences the utilization of location tracking and distance measurement systems which use a UWB communication method.

Distance measurement methods using a UWB communication method are mainly classified into a UWB-Impulse Radio (IR) method and a UWB-chirp method.

The UWB-IR method is problematic in that, since transmission power must be increased so as to increase measurable distances and measurement accuracy, instantaneous peak power is also increased when transmission power is increased. In order to increase transmission power without increasing instantaneous peak power, a temporally longer signal must be used. Therefore, there has been proposed the UWB-chirp method of measuring distance between objects using a chirp waveform which has a temporal length at least 10 times as long as that of the monocycle waveform of the UWB-IR method and has characteristics identical to those of the monocycle waveform.

The UWB communication method using such a chirp waveform is advantageous in that it uses a modulated waveform having a long duration without resulting in a high peak value compared to an average rate, thus enabling the system to avoid the nonlinearity of a power amplifier.

However, such a UWB communication method using a chirp waveform is problematic in that great Narrow Band Interference (NBI) occurs in a band due to the use of wideband frequencies which are basic characteristics of UWB. NBI in such a UWB communication method causes great difficulty when those skilled in the art design communication systems. In particular, in a distance measurement system using a UWB communication system, the reliability of distance measurement is greatly influenced by the reliability of communication. Accordingly, there is a need for a UWB communication method capable of improving reliability by decreasing the influence of NBI on a frequency band and a UWB distance measurement system using the UWB communication method.

The above information disclosed in this Background section is only for enhancement of understanding of the background of the invention and therefore it may contain information that does not form the prior art that is already known in this country to a person of ordinary skill in the art.

SUMMARY

Accordingly, the present invention has been made keeping in mind the above problems occurring in the prior art, and an object of the present invention is to provide a UWB distance measurement system and a method of driving the system, which can solve the problem of the prior art associated with NBI occurring in a ultra wide band so that the influence of NBI on a frequency band can be reduced, and thus reliability can be improved.

In one aspect, the present invention provides a UWB distance measurement system using a linear chirp waveform, comprising a reception antenna for receiving a signal, which is output from a transmission unit, is reflected from a target and is incident on the reception antenna, a UWB amplifier for amplifying the signal received from the reception antenna and generating a first signal, a reference waveform generator for generating a reference waveform which is a reference for analysis of the first signal, a window function generator for generating at least one window function that is applied to the first signal on a basis of the reference waveform output from the reference waveform generator, a correlator for correlating the first signal output from the UWB amplifier with the window function output from the window function generator, and generating a second signal which is a revised frequency response of the first signal, and a delay time detector for detecting a delay time component in the second signal output from the correlator.

Preferably, the window function generator generates any one of a Hanning window function, a Blackman window function and a Bartlett window function.

Preferably, any one of the Hanning window function, the Blackman window function and the Bartlett window function is applied to the first signal, thus widening a main lobe of the first signal while reducing a side lobe of the first signal.

In another aspect, the present invention provides a method of driving an Ultra WideBand (UWB) distance measurement system for measuring a distance to a target using a linear chirp waveform, comprising receiving a signal reflected from a target using a reception antenna, amplifying the signal received through the reception antenna to a first signal using a UWB amplifier, generating a reference waveform, which is a reference for analysis of the first signal, using a reference waveform generator, generating at least one window function using a window function generator, generating using a correlator a second signal, which is a revised frequency response of the first signal, by applying the window function to the first signal on a basis of the reference waveform, and detecting a time delay component in the second signal.

Preferably, the window function is any one of a Hanning window function, a Blackman window function and a Bartlett window function.

Preferably, any one of the Hanning window function, the Blackman window function and the Bartlett window function is applied to the first signal, thus widening a main lobe of the first signal while reducing a side lobe of the first signal.

Preferably, the Hanning window function is represented by the following Equation:

$$W_{hanning}(v) = \rho + (1-\rho)\cos(2\pi v/B)$$

Preferably, the Blackman window function is represented by the following equation:

$$W_{Blackman}(v) = 0.42 + 0.5 \cos(2\pi v/B) + 0.08 \cos(4\pi v/B)$$

Preferably, the Bartlett window function is represented by the following equation:

$$W_{Bartlett}(v) = \frac{2}{B}\left(\frac{B}{2} - \left|v - \frac{B}{2}\right|\right).$$

Preferably, the second signal generated by applying the window function to the first signal is represented by the following equation:

$$y_w(t) = \rho y(t) + \frac{1}{2}(1-\rho)y\left(\tau - \frac{1}{TB}\right)e^{\frac{i2\pi f_0}{B}} + \frac{1}{2}(1-\rho)y\left(\tau + \frac{1}{TB}\right)e^{\frac{i2\pi f_0}{B}}$$

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Hereinafter, embodiments of the present invention will be described in detail with reference to the attached drawings.

Recently, a UWB communication method and ITS are combined with each other, so that various public and private services have been provided. Such an ITS further improves stability, efficiency and reliability in road states and vehicle traveling through the combination with the UWB communication method, and, moreover, ITS has been developed into an environment-friendly system.

In order to prevent traffic accidents and provide highly reliable vehicle traveling information in ITS, technology for measuring accurate distance between traveling vehicles is required. For this requirement, a UWB distance measurement system according to an embodiment of the present invention is intended to propose a pulse compression method for the distance measurement system using a UWB communication method.

The UWB distance measurement system according to an embodiment of the present invention is based on a linear chirp method capable of performing accurate distance measurement so as to overcome the disadvantage of an Impulse Radio (IR) system.

In the case of a temporally limited chirp waveform, since a receiver matched filter calculates a high-level side lobe, accuracy is decreased at the time of performing the distance measurement of a moving object, such as a vehicle, using NBI.

The UWB distance measurement system according to the embodiment of the present invention introduces a concept of one or more windows to reduce the level of a side lobe in a temporally limited chirp waveform. Through the introduction of a concept of one or more windows, a main lobe is widened and a side lobe is reduced so that high resolution of vehicle radar can be acquired. Here, the term "main lobe" means directivity characteristics in a radiation direction having the maximum power, and the term "side lobe" means directivity characteristics other than those of the main lobe. Since the side lobe exerts negative influences, such as interference or noise, on communication, it is preferable to minimize the side lobe if possible.

Since a chirp signal is temporally limited, the output of a matched filter can increase a side lobe in real-time Fourier output when a received signal passes through the matched filter. In the case where such an increase in side lobe is observed on the basis of the analysis of spectrums, it can be seen that the side lobe may cause problems in discriminating individual frequency components from each other.

In conformity with FCC standards, a frequency band ranging from 3.10 GHz to 10.60 GHz is assigned to a UWB communication method. In the frequency bandwidth of UWB, narrow-band frequencies have already been assigned to other wireless services, such as a Global Positioning System (GPS), a Wireless Local Area Network (WLAN), and wireless phones, so that the relevant services have been provided. Further, since the UWB communication method has a power spectrum density much lower than other communication methods, interference may occur due to communication methods having a high power spectrum density, such as existing IEEE 802.11a WLAN, thus decreasing the accuracy of distance measurement.

It is very difficult to fundamentally eliminate NBI, so that such NBI can be minimized by relatively limiting the power of NBI compared to the threshold of UWB signal power. However, a side lobe contributes energy to the entire frequency band of a UWB system, and thus it is also very difficult to control the power of a large amount of NBI.

The UWB distance measurement system according to the embodiment of the present invention introduces a concept of one or more windows, as described above, in order to solve such difficult problems. The concept of windows according to the present invention is disclosed in "Notes for Hamming Weights of Linear FM Impulse" by J. J. G. McCue in IEEE, Proc., Vol. 67, PP. 1575-1577, 1979.

In the present invention, windows are generated in a template signal using one or more common window functions, such as Hanning, Blackman and Bartlett, and thus the amplitude of a side lobe can be reduced and the width of a main lobe can be widened. In the present invention, windows by which a matched filter transfer function is multiplied are defined as weights in a frequency domain.

According to the present invention, the UWB distance measurement system can suppress NBI to a special frequency tone using one or more window functions, such as Hanning, Blackman and Bartlett, for template signals, thus improving the accuracy of the measurement of distance to a target such as a vehicle.

In order to verify the effects of the present invention, the performance of the prior art using linear waveforms is compared with the performance of the UWB distance measurement system using linear chirp waveforms limited by one or more windows according to the embodiment of the present invention by conducting experiments disclosed in a subsequent detailed description.

The basis of distance measurement is the measurement of a distance from a specific node to a target, that is, a distance 'd' between a transmitter and a receiver. Basically, distance measurement methods mainly include two methods.

A first distance measurement method is a Received Signal Strength Indicator (RSSI) method, in which a receiver measures the power of a received signal and derives a distance from the attenuation of the measured power.

Here, the relationship between a distance and attenuation varies according to the attribute of channels, and the attribute of channels includes the mobility of a target and unpredictable variations, so that it is difficult to design an accurate propagation model. Therefore, in regard to current technology, it is impossible to realize accurate distance measurement using only the RSSI method.

The other distance measurement method is a Time of Arrival (TOA) method, in which a distance is calculated on the basis of an estimated propagation delay value between a transmitter and a receiver. Such a TOA method is a distance measurement method most widely used in radar systems. In the present invention, a distance measurement system is designed using the TOA method having higher accuracy in distance measurement.

Figure 1:
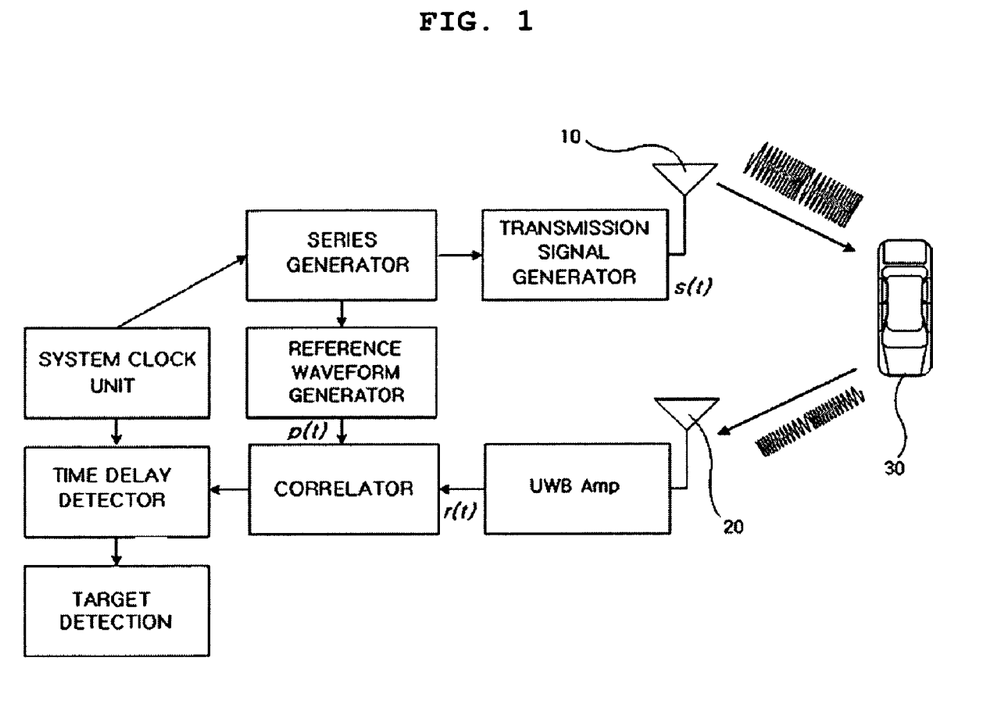
FIG. 1 is a diagram showing the construction of a conventional distance measurement system using a UWB communication method.

FIG. 1 is a diagram showing the construction of a conventional distance measurement system using a UWB communication method.

Referring to FIG. 1, when a radio signal generated by a transmission signal generator is transmitted through a transmission antenna 10, the transmitted radio signal is reflected from a target 30. A reception antenna 20 receives the reflected signal, and the waveform of the received signal is amplified by a UWB amplifier (UWB Amp). Thereafter, the received waveform correlates with a reference signal generated by a reference waveform generator, so that a delay time is evaluated, and thus the distance to the target 30 is finally measured.

Here, the transmitted signal is defined as s(t), and is calculated using a single-path channel h(t) having Additive White Gaussian Noise (AWGN) n(t). In consideration of the fact that interference may exist in a wide band permitted for a UWB communication method due to a large number of narrow band frequencies permitted to use the same frequency band for respective services, such a narrow band system may be regarded as an NBI source represented by i(t). Accordingly, the received signal r(t) can be represented by the following Equation (1).

$$r(t)=s(t)*h(t)+n(t)+i(t) \quad (1)$$

A radio channel h(t) can be given by the following Equation (2), $$h(t)=a(d)\delta(\tau-(d)) \quad (2)$$

where a(d) and τ(d) denote functions of distance d for amplitude attenuation and time delay, respectively. The received signal can be represented by the following Equation (3).

$$r(t)=a(d)s(t-\tau(d))+n(t)+i(t) \quad (3)$$

From the above analysis, the distance d can be calculated on the basis of the attenuation function a(d) or the time delay function τ(d). Therefore, the distance to the target 30 can be given by the following Equation (4), $$d = \frac{1}{2}c\tau(d) \qquad (4)$$

where c is the speed of light, that is, about $3\times10^8$ m/s.

Meanwhile, in order to introduce a concept of resolution, when a pulse is transmitted at time "t=0" in a duration of "τ" seconds, respective pulses must be spaced apart from each other by at least ½cτ to divide the contributions from two scattering signals into different time samples. The amount of ½cτ is defined as distance resolution.

The UWB distance measurement system according to an embodiment of the present invention uses a linear chirp waveform, which can be represented by the following Equation (5).

$$w_c(t) = rect\left(\frac{t}{T}\right)\cos(\Omega(t)) \qquad (5)$$
$$= rect\left(\frac{t}{T}\right)\cos(2\pi f_0 t + \pi\mu t^2)$$

In Equation (5), $w_c(t)$ denotes "0" placed outside the length of a time interval T, and $f_0$ denotes a center frequency. Here, a frequency bandwidth is B=|μ|t, and the term "linear chirp waveform" means that the instantaneous frequency $f_c(t)$ and time t maintain a linear relationship. This relationship can be represented by the following Equation (6).

$$f_c(t) = \frac{1}{2\pi}\frac{d\Omega(t)}{dt} = f_0 + \mu t \qquad (6)$$

A chirp speed is a derivative of instantaneous frequency $f_c(t)$, and means variation in instantaneous frequency. β(t) shown in the following Equation [7] is defined as the chirp speed.

$$\beta(t) = \frac{1}{2\pi}\frac{d^2\Omega(t)}{dt} = \frac{df_c(t)}{dt} = \mu = \frac{B}{T} \qquad (7)$$

Through the above Equation (7), the variation in instantaneous frequency can be known. A chirp waveform at μ>0 denotes an up-chirp waveform, and a chirp waveform at μ<0 denotes a down-chirp waveform.

A concept of linearity is an important concept in digital communication. A mathematical concept related to the linearity of the system means that the ratio of an input signal to an output signal can be implemented linearly, that is, using a linear equation y=ax+b. When the system is linear, the prediction of results is easy, and thus system control is facilitated. However, in a wireless communication system, since a nonlinear circuit including active devices can not be excluded, there are many cases in which the system cannot be linearly operated in practice.

Accordingly, it is intended to prevent the occurrence of unknown malfunction or the deterioration of system performance by maximally linearly operating the communication system. In digital communication, such as Code Division Multiple Access (CDMA), since a plurality of frequency signals is simultaneously processed in one band, linearity is more important so as to minimize the interference between the signals. That is, in a communication system, linearity may be a measure for indicating whether communication can be performed without causing interference in the state in which the cross-modulation of respective signals is minimized.

The UWB distance measurement system according to the embodiment of the present invention uses a method of compressing pulses while using a linear chirp waveform in order to improve the accuracy of distance measurement.

Such pulse compression is required for the transmission of long-duration pulses in a distance measurement procedure, and the envelope of the linear chirp waveform at this time can be represented by the following Equation (8).

$$m(t) = rect\left(\frac{t}{T}\right)e^{j(2\pi f_0 t + \pi\mu t^2)} \quad -\frac{T}{2} \le t \le \frac{T}{2} \qquad (8)$$

The purpose of pulse compression is to convert transmitted pulses having a long main lobe or having no main lobe into pulses having a short main lobe.

Such pulse compression may be implemented by a matched filter. At this time, impulse h(t)=m*(−t), and the transmitted pulses are expanded pulses. Meanwhile, the output pulses of the matched filter are defined as compressed pulses and can be represented by the following Equation (9).

$$p(t) = \int_{-\infty}^{\infty} h(\tau)m(t-\tau)d\tau \qquad (9)$$
$$= \int_{-\infty}^{\infty} m^*(-\tau)m(t-\tau)d\tau$$
$$= \int_{-\infty}^{\infty} rect\left(\frac{\tau}{T}\right)e^{j(2\pi f_0 \tau - \pi\mu\tau^2)} rect\left(\frac{t-\tau}{T}\right)e^{j[2\pi f_0(t-\tau)+\pi\mu(t-\tau)^2]}d\tau$$
$$= Te^{j2\pi f_0 t}\operatorname{sinc}\left(T\mu t\left(1 - \frac{|t|}{T}\right)\right)\left(1 - \frac{|t|}{T}\right) \quad -T \le t \le T$$

Therefore, the output of the matched filter can be represented by the following Equation (10).

$$y(t) = T\cos(2\pi f_0 t)\operatorname{sinc}\left(T\mu t\left(1 - \frac{|t|}{T}\right)\right)\left(1 - \frac{|t|}{T}\right) \qquad (10)$$

Since a signal has a finite length, the output results of the filter exhibit the characteristics of a side lobe. The reason for this is that the output of the filter, matched through approximately orthogonal Linear Frequency Modulation (LFM), creates a distance response similar to a sine wave.

Two methods can be used to reduce the influence of a side lobe on a linear chirp waveform. The two methods include a method of standardizing a reception frequency response and a method of standardizing a waveform spectrum.

The UWB distance measurement system according to the embodiment of the present invention is intended to apply a window function to an impulse response so as to reduce the side lobe of the frequency response of a pulse. In particular, a method of limiting the frequency response of a receiver by a window from the standpoint of frequency is applied.

Figure 2:
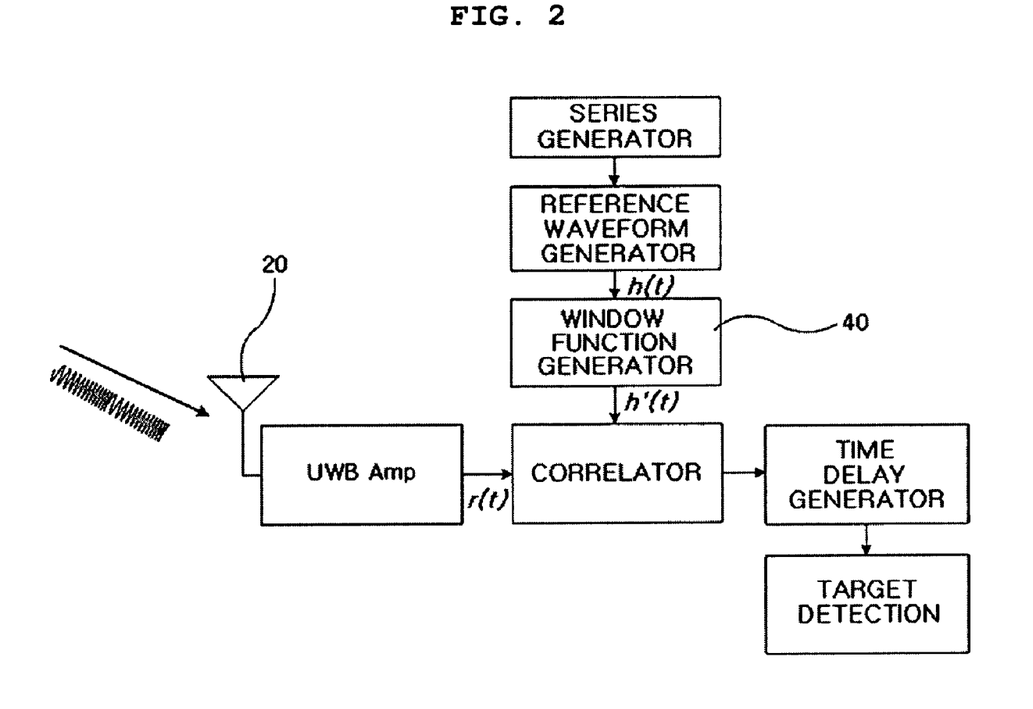
FIG. 2 is a diagram showing the construction of the receiver of a distance measurement system using a UWB communication method according to an embodiment of the present invention.

For this operation, the UWB distance measurement system according to the embodiment of the present invention includes a window function generator 40 for generating one or more window functions in the construction of the receiver, as shown in FIG. 2.

The frequency response of a matched filter is $H(f)=C^*(f)$. In this case, when one or more window functions $W(f)$ generated by the window function generator 40 are multiplied by the frequency response $H(f)$, a revised frequency response $H'(f)$ can be obtained. That is, from the standpoint of frequency, weights corresponding to the window functions are applied.

Figure 3A:
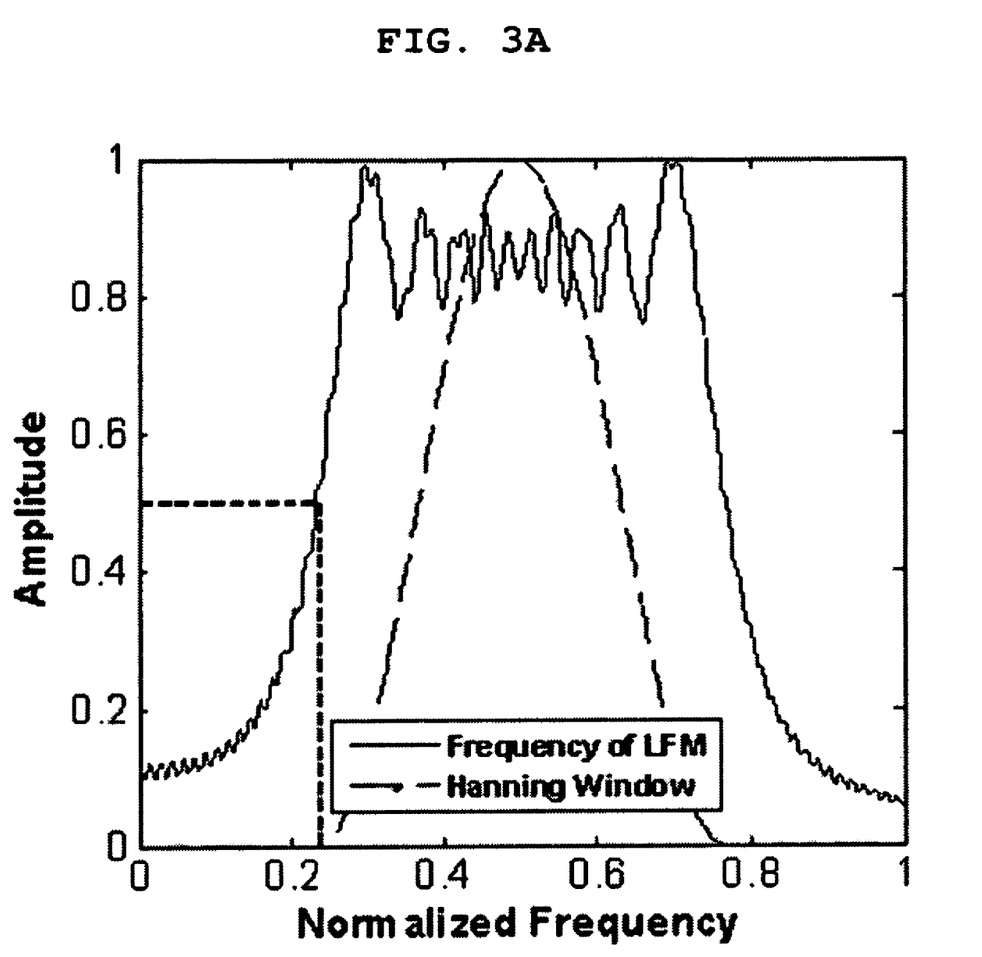
FIGS. 3A and 3B are waveform diagrams showing Hanning weights of a linear chirp frequency response.
Figure 3B:
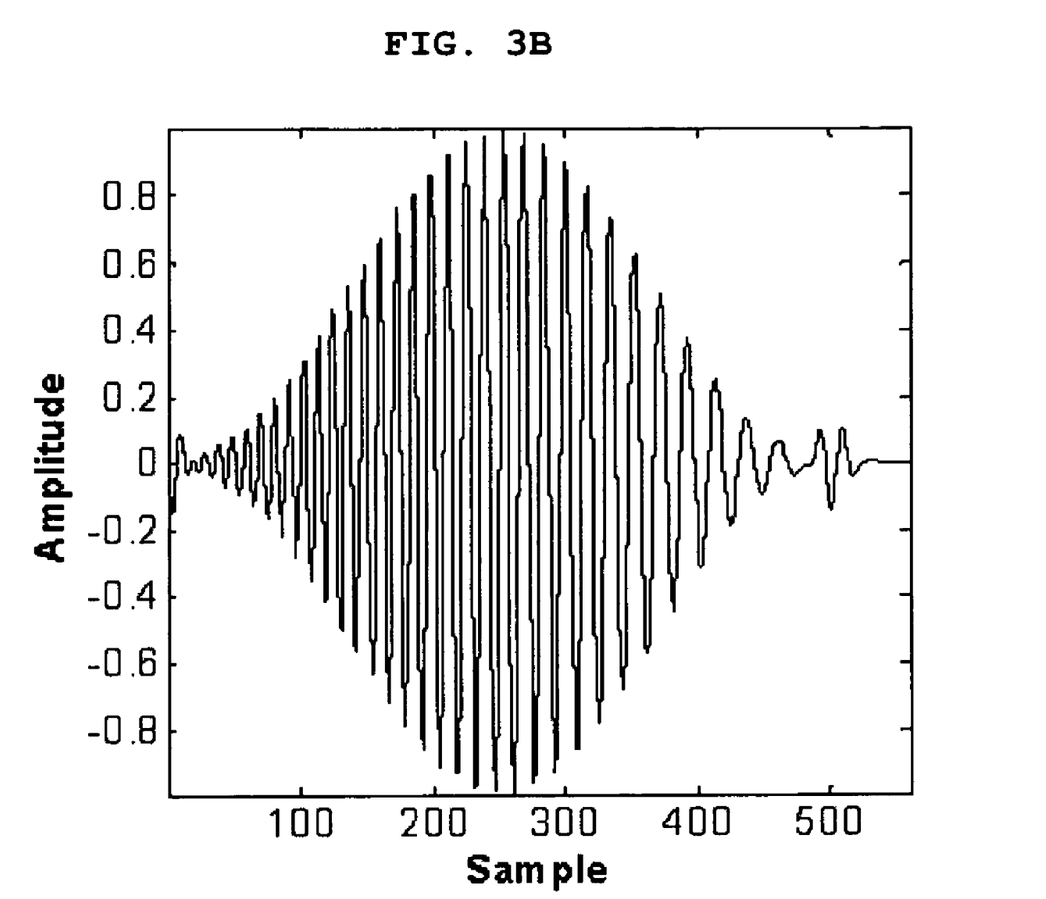

FIGS. 3A and 3B are waveform diagrams showing the Hanning weight of a linear chirp frequency response, FIG. 3A illustrating a Hanning window function overlapping a matched filter frequency response, and FIG. 3B illustrating an impulse response h'(t).

Among the three windows proposed in the present invention, a Hanning window is a special case of a cosine-series window and has a form of $\cos^a(KT)$, where a denotes an integer capable of defining the type of window. When a=2, a relevant window can be defined as a Hanning window, which can be represented by the following Equation (11), $$W_{hanning}(v)=\rho+(1-\rho)\cos(2\pi v/B) \quad (11)$$

where V is a deviation from the center frequency of the receiver, and B denotes the above-described bandwidth, that is, $\rho=0.5$.

When a UWB signal is not placed at the center of the window, the attenuation of a signal occurs, so that the performance of the system may be deteriorated. Therefore, in order to improve the accuracy of the system, the UWB signal must be placed at the center of the window.

When $W_{hanning}(v)$ of Equation (11) is applied as a weight corresponding to the Hanning window function, the output of the matched filter y(t) is changed, as shown in the following Equation (12).

$$y_w(t) = \rho y(t) + \frac{1}{2}(1-\rho)y\left(\tau - \frac{1}{TB}\right)e^{\frac{i2\pi f_0}{B}} + \frac{1}{2}(1-\rho)y\left(\tau + \frac{1}{TB}\right)e^{\frac{i2\pi f_0}{B}} \quad (12)$$

Next, a Blackman window can be designated as a weight applied to a time domain to reduce leakage in the analysis of a Fourier transform, and can be represented by the following Equation (13).

$$W_{Blackman}(v)=0.42+0.5\cos(2\pi v/B)+0.08\cos(4\pi v/B) \quad (13)$$

When a rectangular window is selected, a sharp transition from 0 to 1 occurs at the edge of the window. In order to prevent such a sharp transition, a Bartlett window can be used.

Such a Bartlett window can be represented by the following Equation (14).

$$W_{Bartlett}(v) = \frac{2}{B}\left(\frac{B}{2} - \left|v - \frac{B}{2}\right|\right) \quad (14)$$

In order to compare the performance of the UWB distance measurement system using the concept of the above-described three windows according to the embodiments of the present invention with that of the prior art using linear waveforms, experiments were conducted under the conditions given by the following Table 1.

TABLE 1

| | |
|---|---|
| Number of measurements | 100,000 |
| Length of one chirp waveform ($T_s$) | 10 [ns] |
| Number of chirp waveforms/bit ($N_s$) | 8 |
| Available bandwidth | 3.10~10.60 [GHz] |
| Center frequency of NBI ($f_i$) | 5.30 [GHz] |
| Weight (window) function | Hanning, Blackman, Bartlett |
| Channel mode | AWGN |

Figure 4A:
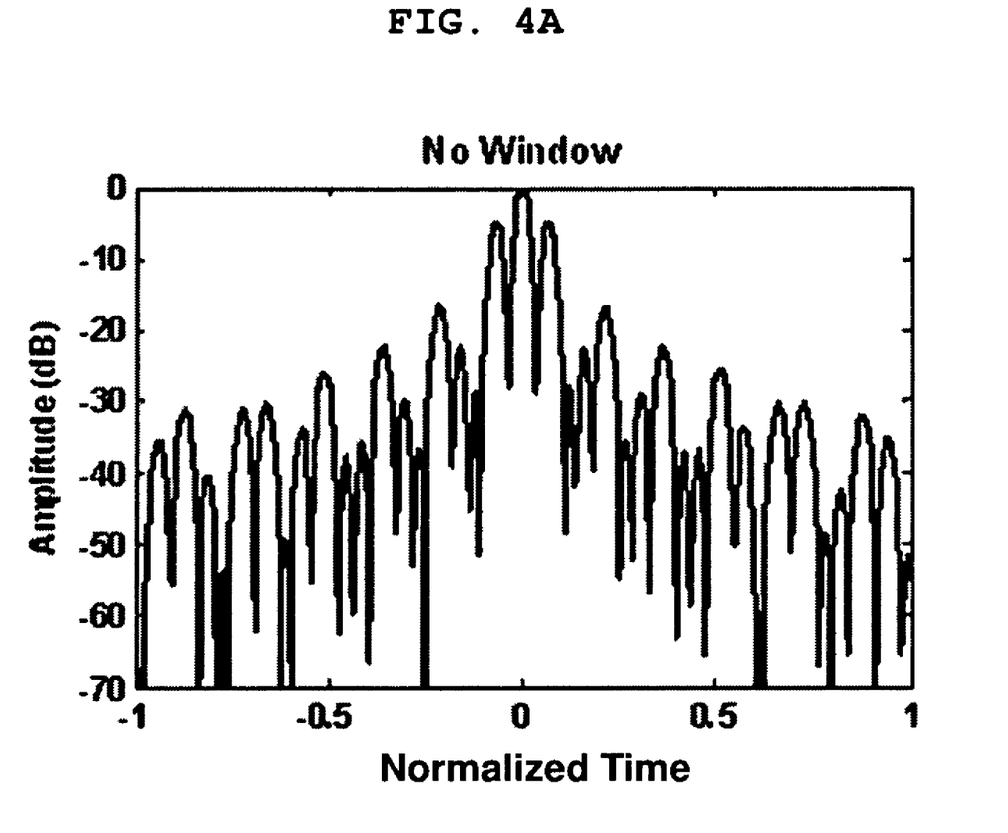
FIG. 4A is a diagram showing a chirp waveform compressed without using a weight corresponding to a window function.
Figure 4B:
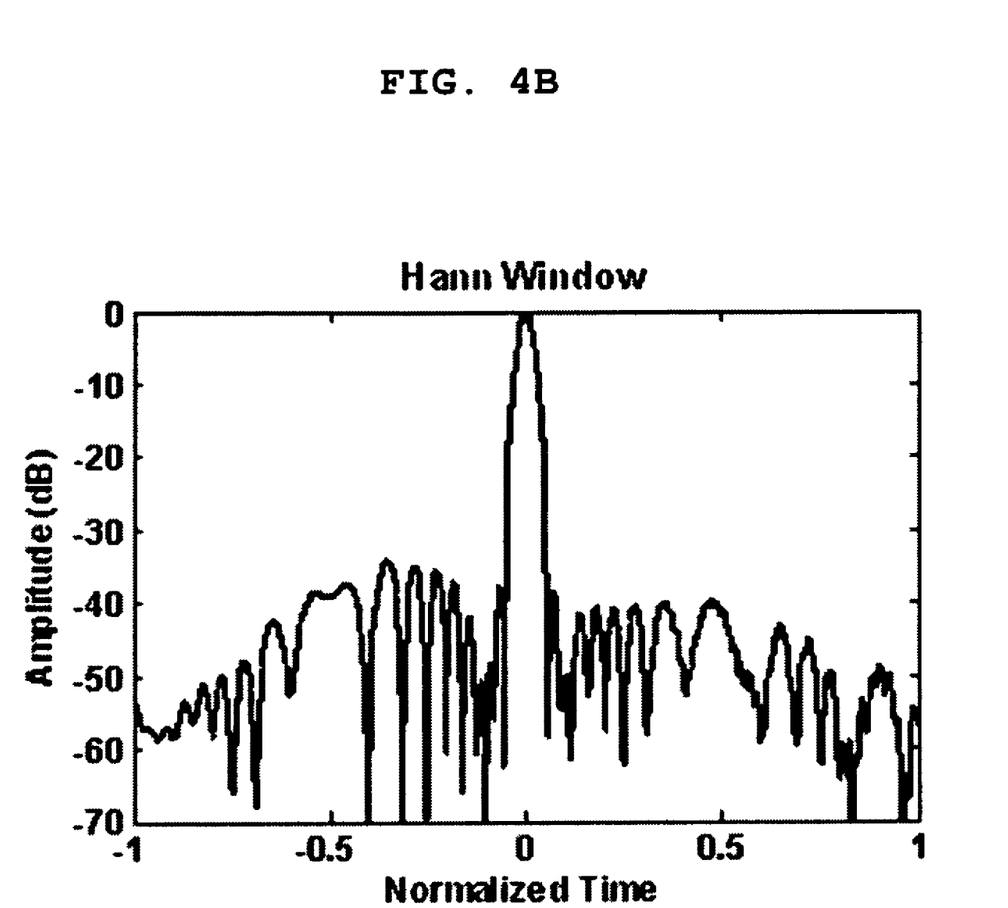
FIG. 4B is a diagram showing a chirp waveform to which a weight corresponding to a Hanning window function is applied.

The experiments shown in Table 1 are intended to evaluate the error rate of the distance measurement of the distance measurement system. The output results of compressed pulses obtained through the experiments are shown in FIGS. 4A and 4B. Here, FIG. 4A is a diagram showing a chirp waveform compressed without using a weight corresponding to a window function, and FIGS. 4B, 4C and 4D are diagrams showing chirp waveforms to which weights corresponding to a Hanning window function, a Blackman window function, and a Bartlett window function, respectively, are applied.

Figure 4C:
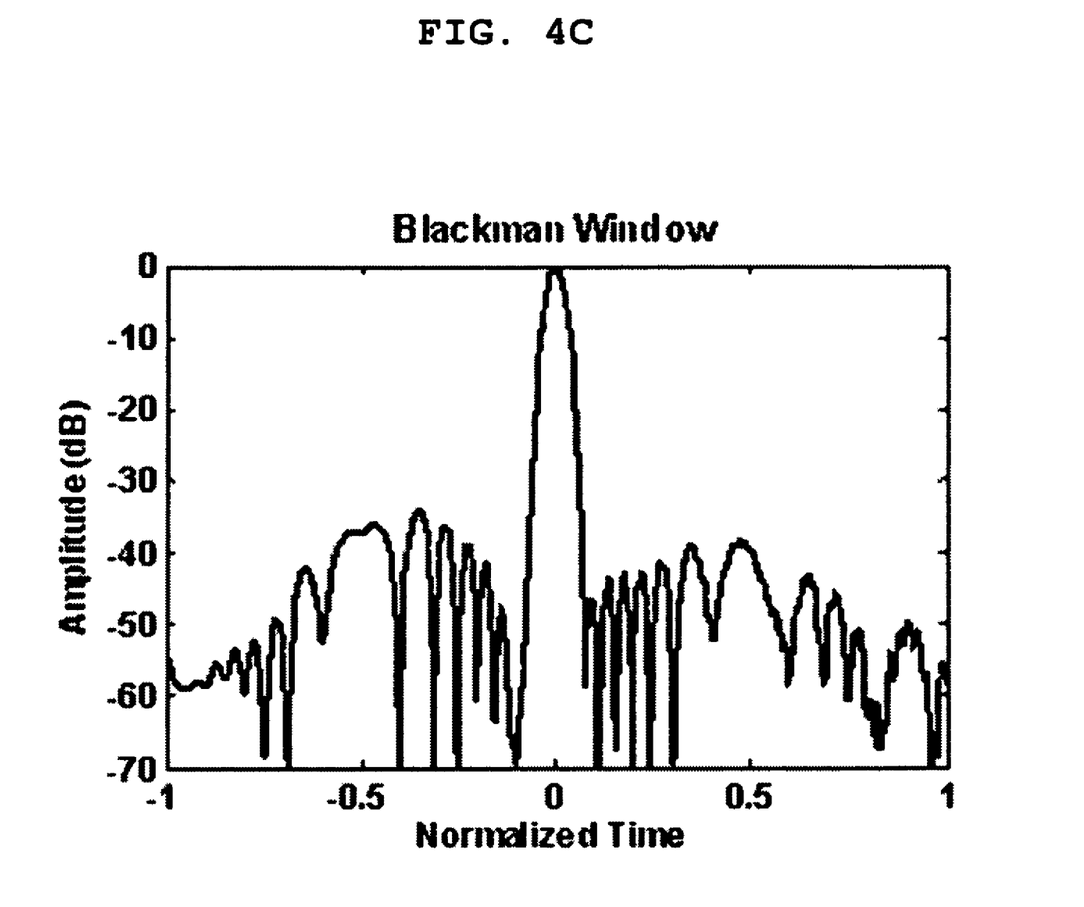
FIG. 4C is a diagram showing a chirp waveform to which a weight corresponding to a Blackman window function is applied.
Figure 4D:
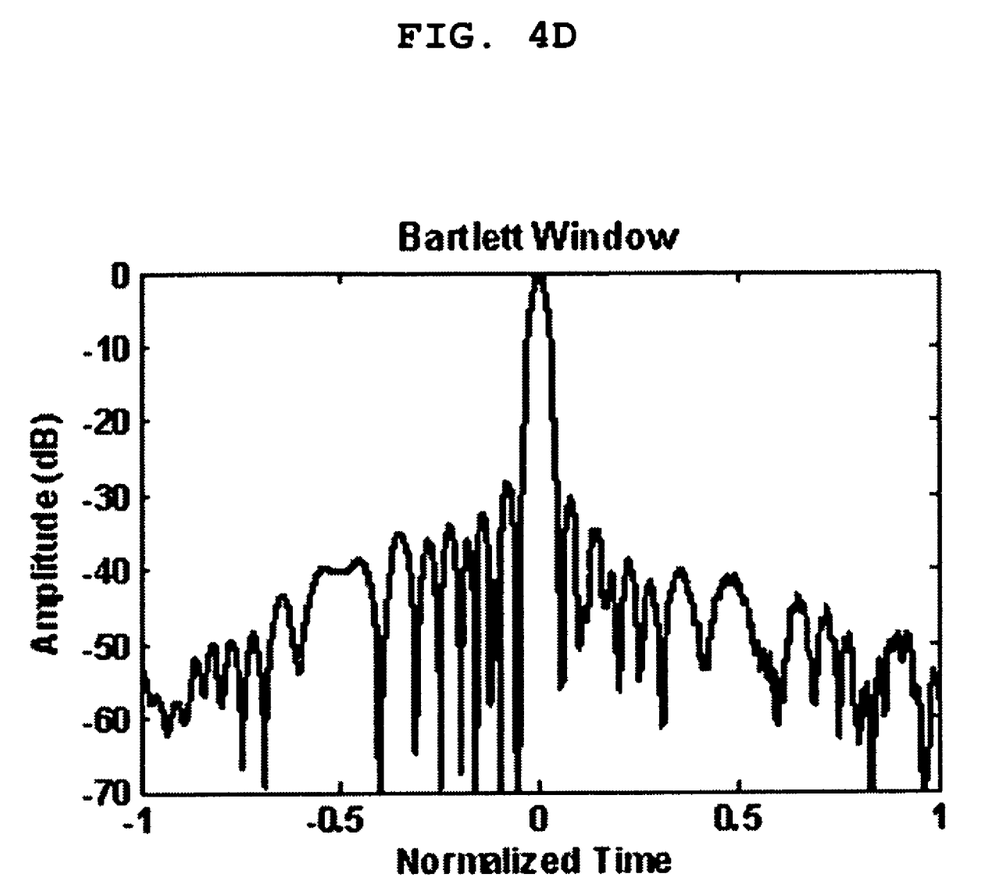
FIG. 4D is a diagram showing a chirp waveform to which a weight corresponding to a Bartlett window function is applied.

It can be seen through the results of the experiments that the system using chirp waveforms to which weights corresponding to one or more window functions, such as Hanning, Blackman, and Bartlett, are applied, as shown in FIGS. 4B to 4D, rather than the chirp waveform compressed without using a weight corresponding to a window function, as shown in FIG. 4A, can significantly reduce the side lobe of the matched filter output compared to the prior art.

As described above, a side lobe denotes directivity characteristics other than those of a main lobe, and is a factor negatively influencing communication, such as interference or noise. Such an increase in the side lobe may cause a problem in discriminating individual frequency components from each other.

Figure 5:
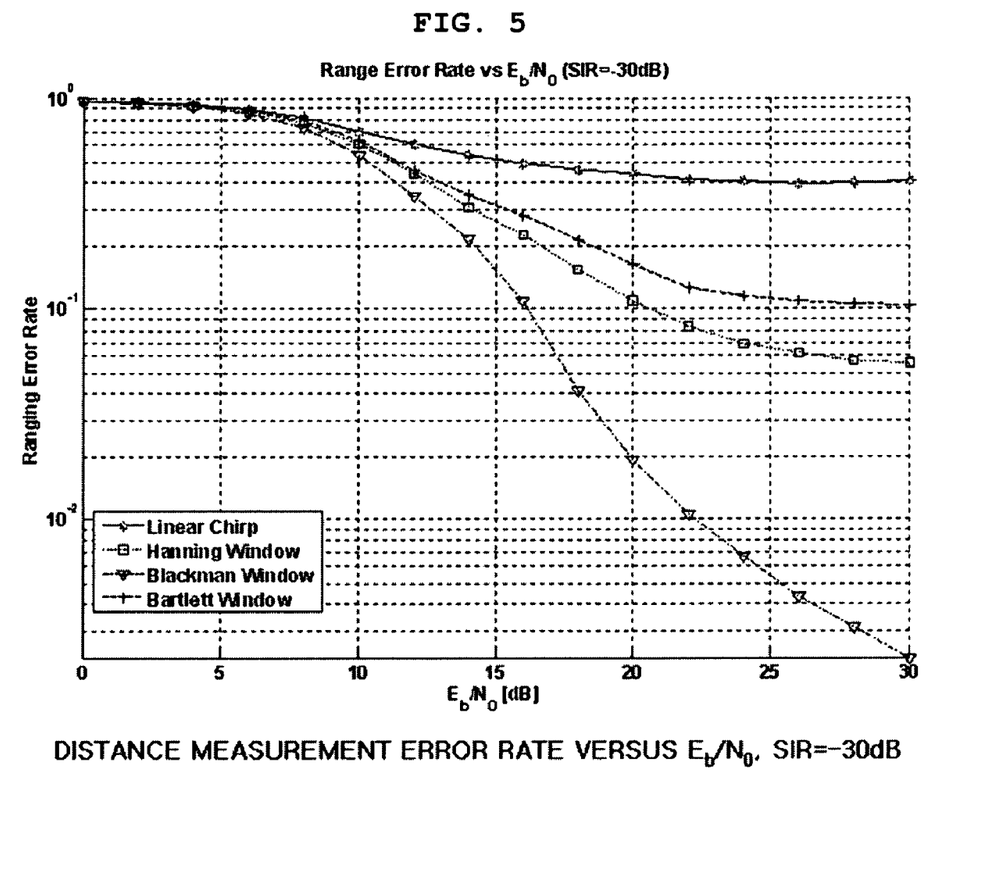
FIGS. 5 and 6 are diagrams showing error rates of distance measurement of UWB distance measurement systems using a linear chirp waveform and chirp waveforms limited by windows according to embodiments of the present invention.
Figure 6:
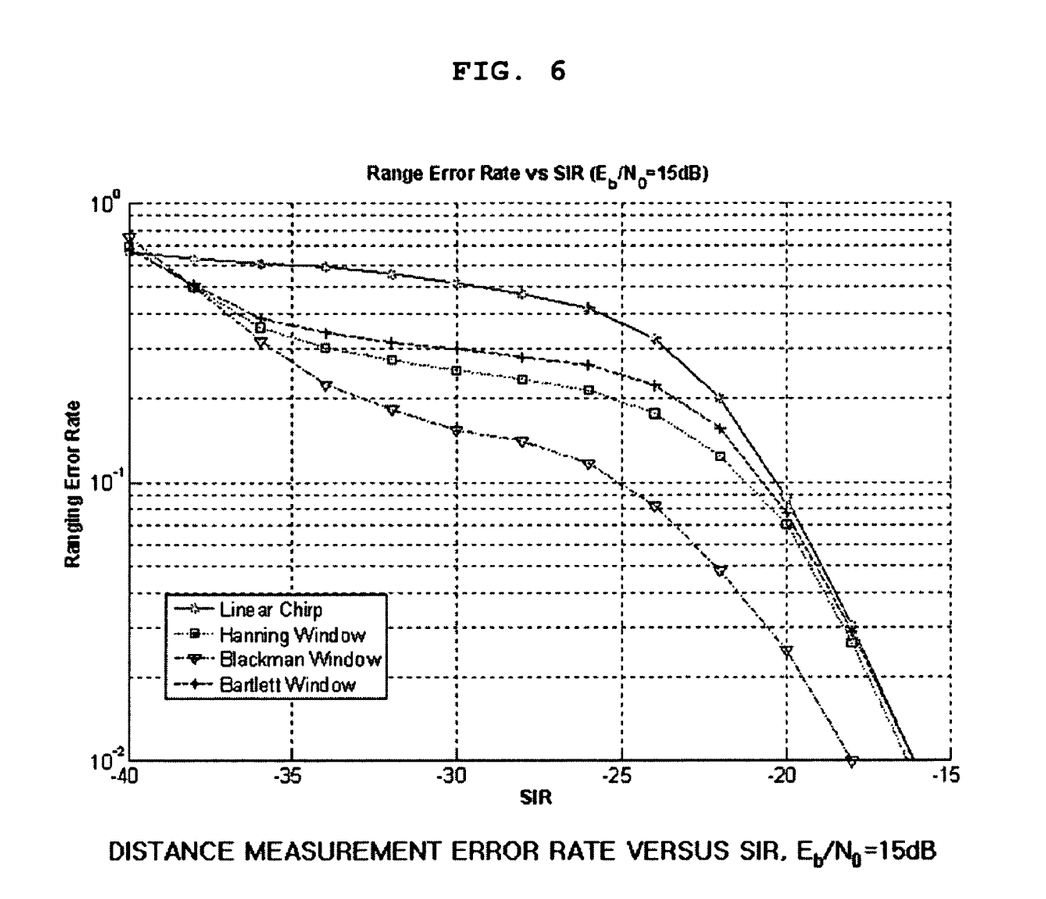

The error rates of distance measurement of the UWB distance measurement system according to the embodiments of the present invention, obtained by conducting experiments under the conditions of Table 1 using a linear chirp waveform and chirp waveforms limited by windows, respectively, are shown in FIGS. 5 and 6. FIG. 5 shows a distance measurement error rate represented by error rate versus $E_b/N_0$ at Signal-to-Interference Ratio (SIR)=-30 dB, and FIG. 6 shows a distance measurement error rate represented by error rate versus SIR at $E_b/N_0$=15 dB.

Through the above experimental results, it can be seen that, in the UWB distance measurement system according to the embodiments of the present invention, all Bit Error Rate (BER) values reach lower limits when interface power values are different from each other, as shown in FIGS. 5 and 6.

The UWB distance measurement system according to embodiments of the present invention is advantageous in that it applies weights corresponding to one or more window functions, such as Hanning, Blackman, and Bartlett, to a linear chirp waveform, so that the side lobe of the output of a matched filter is reduced and the main lobe thereof is widened in a communication system, thus acquiring higher resolution in vehicle radar. Through this advantage, it can be seen that the UWB distance measurement system according to embodiments of the present invention acquires a NBI suppression capability in a wide band, so that negative factors, such as interference and noise which are the most important factors in communication, are minimized, and thus the accuracy and reliability of communication can be improved.

As described above, the UWB distance measurement system according to embodiments of the present invention is advantageous in that it applies weights corresponding to one or more window functions, such as Hanning, Blackman, and Bartlett, to a linear chirp waveform, so that the side lobe of the output of a matched filter is reduced and the main lobe thereof is widened in a communication system, thus acquiring higher resolution in vehicle radar. Through this advantage, it can be seen that the UWB distance measurement system according to embodiments of the present invention acquires a NBI suppression capability in a wide band, so that negative factors, such as interference and noise which are the most important factors in communication, are minimized, and thus the accuracy and reliability of communication can be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Therefore, the technical scope of the present invention should be defined by the accompanying claims rather than the detailed description of the specification.

What is claimed is:

1. An Ultra WideBand (UWB) distance measurement system using a linear chirp waveform, comprising:
    a reception antenna for receiving a signal, which is output from a transmission unit, is reflected from a target and is incident on the reception antenna;
    a UWB amplifier for amplifying the signal received from the reception antenna and generating a first signal;
    a reference waveform generator for generating a reference waveform which is a reference for analysis of the first signal;
    a window function generator for generating at least one window function that is applied to the first signal on a basis of the reference waveform output from the reference waveform generator;
    a correlator for correlating the first signal output from the UWB amplifier with the window function output from the window function generator, and generating a second signal which is a revised frequency response of the first signal; and
    a delay time detector for detecting a delay time component in the second signal output from the correlator.

2. The UWB distance measurement system according to claim 1, wherein the window function generator generates any one of a Hanning window function, a Blackman window function and a Bartlett window function.

3. The UWB distance measurement system according to claim 2, wherein any one of the Hanning window function, the Blackman window function and the Bartlett window function is applied to the first signal, thus widening a main lobe of the first signal while reducing a side lobe of the first signal.

4. A method of driving an Ultra WideBand (UWB) distance measurement system for measuring a distance to a target using a linear chirp waveform, comprising:
    receiving a signal reflected from a target using a reception antenna;
    amplifying the signal received through the reception antenna to a first signal using a UWB amplifier;
    generating a reference waveform, which is a reference for analysis of the first signal, using a reference waveform generator;
    generating at least one window function using a window function generator;
    generating, using a correlator, a second signal, which is a revised frequency response of the first signal, by applying the window function to the first signal on a basis of the reference waveform; and
    detecting a time delay component in the second signal.

5. The method according to claim 4, wherein the window function is any one of a Hanning window function, a Blackman window function and a Bartlett window function.

6. The method according to claim 5, wherein any one of the Hanning window function, the Blackman window function and the Bartlett window function is applied to the first signal, thus widening a main lobe of the first signal while reducing a side lobe of the first signal.

7. The method according to claim 6, wherein:
    the Hanning window function is represented by the following Equation:

$$W_{hanning}(v) = \rho + (1-\rho)\cos(2\pi v/B), \text{ and}$$

the second signal is generated by applying the Hanning window function to the first function.

8. The method according to claim 7, wherein the second signal generated by applying the window function to the first signal is represented by the following equation:

$$y_w(t) = \rho y(t) + \frac{1}{2}(1-\rho)y\left(\tau - \frac{1}{TB}\right)e^{-\frac{i2\pi f_0}{B}} + \frac{1}{2}(1-\rho)y\left(\tau + \frac{1}{TB}\right)e^{\frac{i2\pi f_0}{B}}.$$

9. The method according to claim 6, wherein:
    the Blackman window function is represented by the following equation:

$$W_{Blackman}(v) = 0.42 + 0.5\cos(2\pi v/B) + 0.08\cos(4\pi v/B),$$
    and the second signal is generated by applying the Blackman window function to the first signal.

10. The method according to claim 9, wherein the second signal generated by applying the window function to the first signal is represented by the following equation:

$$y_w(t) = \rho y(t) + \frac{1}{2}(1-\rho)y\left(\tau - \frac{1}{TB}\right)e^{-\frac{i2\pi f_0}{B}} + \frac{1}{2}(1-\rho)y\left(\tau + \frac{1}{TB}\right)e^{\frac{i2\pi f_0}{B}}.$$

11. The method according to claim 6, wherein:
    the Bartlett window function is represented by the following equation:

$$W_{Bartlett}(v) = \frac{2}{B}\left(\frac{B}{2} - \left|v - \frac{B}{2}\right|\right), \text{ and}$$

the second signal is generated by applying the Bartlett window function to the first signal.

12. The method according to claim 11, wherein the second signal generated by applying the window function to the first signal is represented by the following equation:

$$y_w(t) = \rho y(t) + \frac{1}{2}(1-\rho)y\left(\tau - \frac{1}{TB}\right)e^{-\frac{i2\pi f_0}{B}} + \frac{1}{2}(1-\rho)y\left(\tau + \frac{1}{TB}\right)e^{\frac{i2\pi f_0}{B}}.$$

* * * * *